No. 646,993. Patented Apr. 10, 1900.
F. K. IRVING.
MOTOR VEHICLE.
(Application filed June 22, 1899.)
(No Model.) 2 Sheets—Sheet 1.
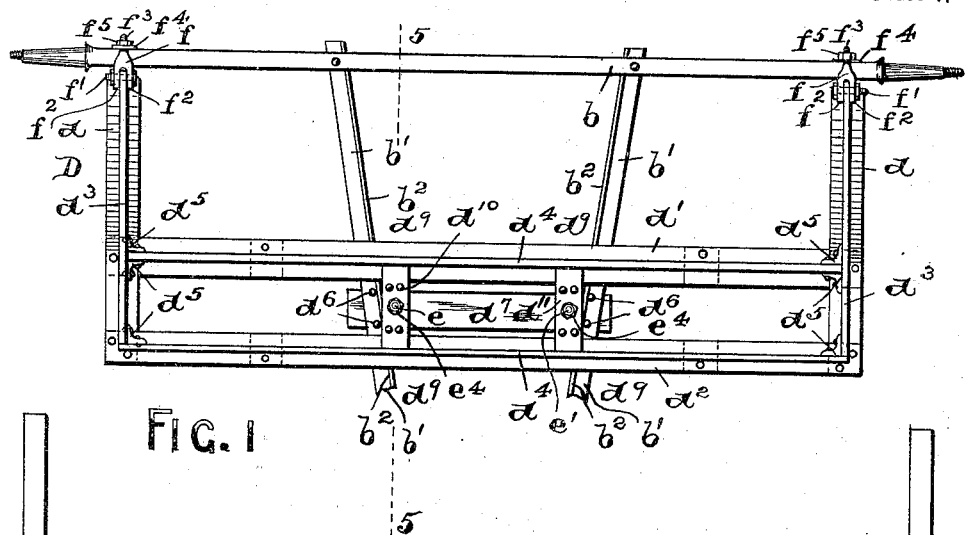
Fig. 1
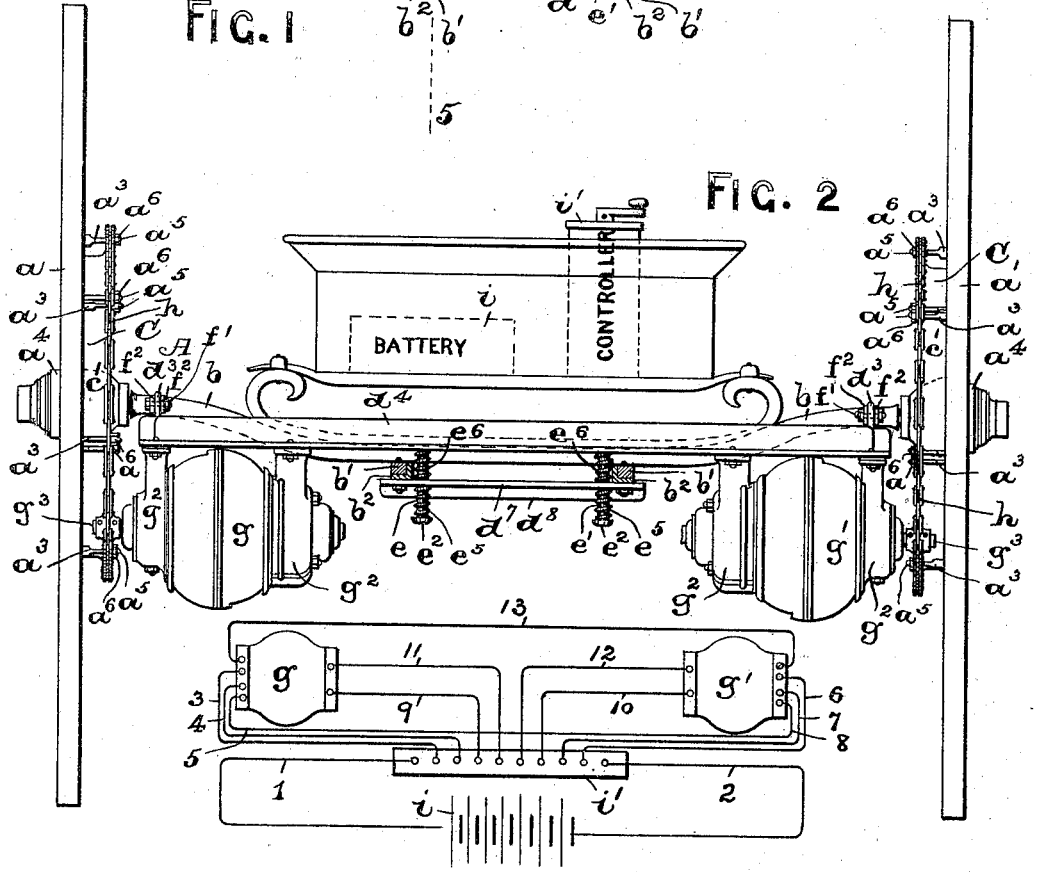
Fig. 2
Fig. 3
WITNESSES:
Walter H. Talmage
INVENTOR:
FRANK K. IRVING,
BY Fred'k C. Fraentzel,
ATTORNEY
THE NORRIS PETERS CO., PHOTO-LITHO., WASHINGTON, D. C.

No. 646,993. Patented Apr. 10, 1900.
F. K. IRVING.
MOTOR VEHICLE.
(Application filed June 22, 1899.)

(No Model.) 2 Sheets—Sheet 2.

WITNESSES:
Walter H. Talmage.
John C. Tindel

INVENTOR:
FRANK K. IRVING,
BY Fred'k C. Fraentzel
ATTORNEY

THE NORRIS PETERS CO., PHOTO-LITHO., WASHINGTON, D. C.

UNITED STATES PATENT OFFICE.

FRANK K. IRVING, OF NEWARK, NEW JERSEY, ASSIGNOR OF ONE-HALF TO ANDREW G. VOGT, OF SAME PLACE.

MOTOR-VEHICLE.

SPECIFICATION forming part of Letters Patent No. 646,993, dated April 10, 1900.

Application filed June 22, 1899. Serial No. 721,416. (No model.)

*To all whom it may concern:*

Be it known that I, FRANK K. IRVING, a citizen of the United States, residing at Newark, in the county of Essex and State of New Jersey, have invented certain new and useful Improvements in Motor-Vehicles; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has reference to novel improvements in means for operatively connecting one or more electric motors with one or more of the wheels of a vehicle—such as a wagon, carriage, or the like; and the invention has for its primary object to provide a mechanical means adapted to be secured in position upon the framework of the vehicle, said means comprising a spring-actuated and spring-supported framework to which the electric motor or motors are operatively connected and are geared with one or more of the wheels or axle of the vehicle, the said supporting-frame being automatically adjustable to any inequalities in the road-bed over which the motor-vehicle is to be propelled.

A further object of this invention is to provide a very simple driving mechanism and supporting-framework for the purpose above stated, which can be cheaply made and can be readily attached to any well-known construction of vehicle now drawn by animals, which permits of the motor or motors to be rigidly attached to the framework and still be free from the effects of vibrations and the sudden and destructive poundings due to inequalities in the road-bed.

My invention therefore consists in the novel arrangements and combinations of the various parts and in the details of the construction thereof, all of which will be hereinafter fully set forth and finally embodied in the clauses of the claim.

The invention is clearly illustrated in the accompanying drawings, in which—

Figure 4:
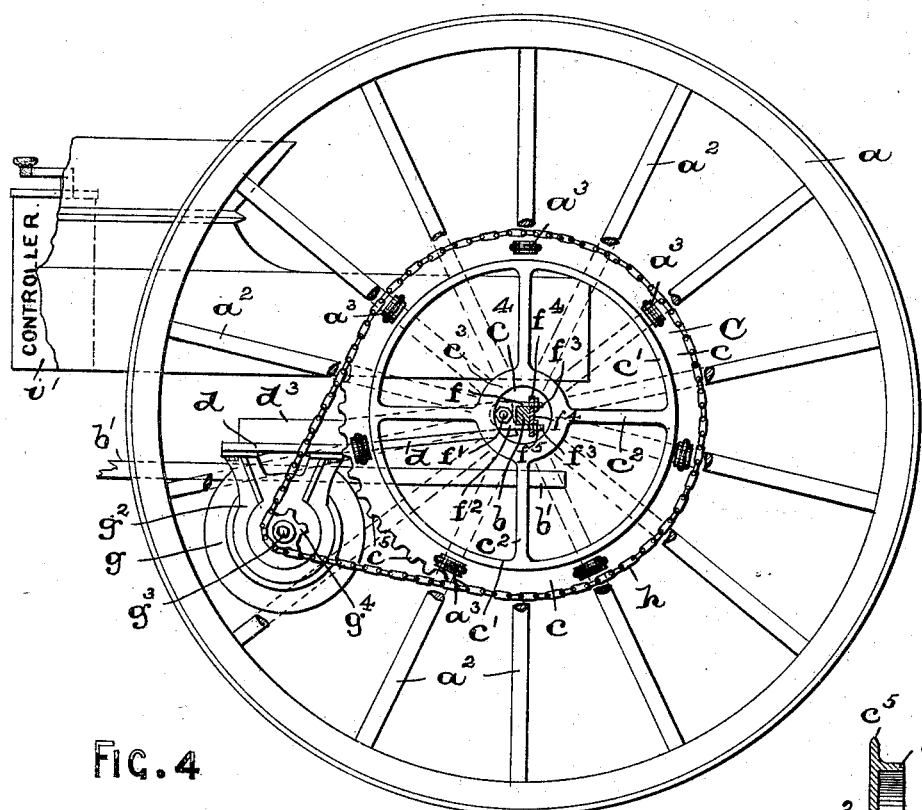
Figure 5:
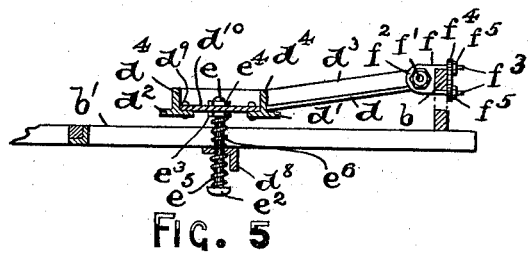
Figure 6:
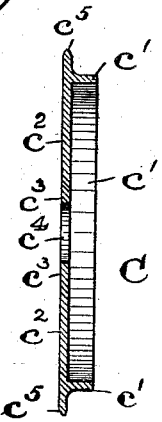

Figure 1 is a top or plan view of a spring-actuated frame for supporting the electric motor or motors, and which frame can be secured in position to the framework of any ordinary vehicle. Fig. 2 is a rear view of one of the well-known forms of vehicles, illustrating in connection therewith and in end view the arrangement of a spring-supported frame and a pair of motors rigidly secured in position thereon, all according to the principles of my present invention. Fig. 3 is a diagrammatic view of a pair of motors, a controller, and battery, with the electric circuits for electrically connecting the motor or motors in circuit with said controller and said battery. Fig. 4 is a side view of a portion of a road-wagon and one of its wheels, with portions of the spokes thereof broken away, and a cross-section of the axle, said view also illustrating in side elevation the arrangement of the spring-supported frame, one of the electric motors, and a gear or driving mechanism operatively connecting the motor with the spokes of one of the wheels of the vehicle. Fig. 5 is a vertical cross-section taken on line 5 5 in Fig. 1, illustrating certain portions of the spring-supported frame and its attachment to the axle of the vehicle and to the reaches forming part of the framework of the vehicle, in said view, however, the motor having been omitted. Fig. 6 is a vertical cross-section of a gear adapted to be secured in operative position against the sides of the spokes of one of the wheels of the vehicle.

Similar letters and figures of reference are employed in all of the said above-described views to indicate corresponding parts.

In said drawings, A indicates the vehicle, which may be of any well-known construction, and $a$ and $a'$ are the rear wheels of the same, said wheels being arranged upon the axle $b$ in the usual and well-known manner and being provided with suitable spokes $a^2$. Secured, preferably, against the inner sides of said spokes, by means of fastening clips or clamps $a^3$, is a gear-wheel C, which consists, essentially, of a part $c$ and an annular flange or shoulder $c'$, arranged as illustrated more especially in Fig. 6, and provided with radially-arranged arms or spokes $c^2$, which are connected with the ring-shaped part $c^3$ at the center of said gear-wheel. Said ring-shaped part $c^3$ has an opening $c^4$ to enable it to be fitted over the hub $a^4$ of the wheel of the vehicle, and said clips or clamps $a^3$ are arranged around the spokes $a^2$ and their screw ends $a^5$ passed through suitably-arranged perforations or holes in the said body portion $c$ of the gear-wheel C and then secured in position by means of the nuts $a^6$, as clearly indicated in Figs. 2 and 4. The circumferential edge of said part $c$ of the wheel C has a suitable arrangement of gear or sprocket teeth $c^5$, substantially as illustrated in the several figures of the drawings.

Secured to the reaches $b'$ and the axle $b$ of the vehicle is a supporting-frame D. Said frame, as will be seen from Figs. 1, 2, 4, and 5, consists, essentially, of a pair of side strips or bars $d$ and a pair of connecting strips or bars $d'$ and $d^2$, all of which are suitably secured together by means of bolts or rivets, and said side bars being preferably provided with the upwardly-extending flanges or ribs $d^3$ and said bars $d'$ and $d^2$ being preferably provided with upwardly-extending flanges or ribs $d^4$, whereby the whole frame thus formed is considerably strengthened. Angle-irons $d^5$ may be secured in the several corners where said flanges or ribs of the various bars join together; but such irons are not absolutely necessary. The said reaches $b'$, hereinabove mentioned, may also be strengthened by the arrangement of suitable L-shaped bars or plates $b^2$, which are suitably secured in position against said reaches, as will be clearly evident from an inspection of Figs. 1 and 2. Secured against the under sides of the said plates $b^2$, and hence to the reaches $b'$, in a position centrally located between the two cross pieces or bars $d'$ and $d^2$ of the supporting-frame D, by means of bolts or rivets $d^6$, is a suitable plate $d^7$, preferably provided upon its under side with a strengthening rib or flange $d^8$, (see Figs. 2 and 5,) and secured in position upon bars or strips $d'$ and $d^2$, by means of bolts or rivets $d^9$ or in any other well-known manner, are a pair of cross-plates $d^{10}$ and $d^{11}$. These last-mentioned plates and the plate $d^7$ are provided with correspondingly-arranged holes or perforations, in which I have arranged suitable rods or bolts $e$ and $e'$, said rods or bolts being provided at the bottom with heads $e^2$ and having arranged upon the upper and screw-threaded ends a pair of nuts $e^3$ and $e^4$, whereby said rods or bolts can be secured in fixed position to the said cross-plates $d^{10}$ and $d^{11}$. As clearly illustrated in said Figs. 2 and 5, I have arranged upon said rods or bolts $e$ and $e'$, between their heads and the under surface of the plate $d^7$, coiled springs $e^5$, and upon the upper portions of each of said rods or bolts, between the upper surface of said plate $d^7$ and the nuts $e^4$, I have arranged a second spring $e^6$, the purposes of which springs will be set forth more in detail hereinafter.

As clearly illustrated in the several figures of the drawings, the rear ends of the side bars $d$ of the frame D are provided with suitably-arranged perforations, in which I have secured certain pivotal pins or bolts, as $f'$, by means of which the ends of said side bars can be pivotally arranged between the perforated ears or lugs $f^2$ of suitably-constructed clips or clamps $f$, which, as will be seen from Figs. 4 and 5, are provided with screw ends $f^3$ and are made to embrace the axle $b$ and are passed through holes in plates $f^4$ against the back of the axle and then secured in position by the nuts $f^5$, as clearly illustrated.

From the above it will be evident that I have devised a spring-supported frame A, which can be readily secured in its proper position on the frame of an ordinary vehicle and which is pivotally connected with the axle of the vehicle, said frame being spring-supported and spring-actuated at its opposite end, so as to compensate for any vibrations due to inequalities in the road-bed, to prevent sudden pounding of the motors $g$ and $g'$, secured upon said frame A, or the destruction of any parts of the said frame. Said motors are operatively arranged in suitable bearings $g^2$, suspended from the under side of the frame A, at or near the front thereof, and upon each motor-shaft $g^3$ I have secured a toothed pinion $g^4$, which is in alinement with the respective gear-wheel C, secured to the wheels of the vehicle, and which drive said gears C by means of sprocket-chains $h$, arranged over the teeth of the respective pinions connected with the motors and those of the said gears C, as clearly illustrated.

Within the body of the vehicle I have arranged any one of the well-known forms of batteries $i$ for supplying the electrical current for running the motors $g$ and $g'$. Within said body of the vehicle I have also placed the usual construction of controller $i'$, by means of which the speed of the motors can be varied and the vehicle caused to be propelled either in a forward or backward direction. The said controller is electrically connected with the battery by means of the circuit-wires 1 and 2, and said controller is in circuit with the motors $g$ and $g'$ by means of an arrangement of circuit-wires 3, 4, 5, 6, 7, 8, 9, 10, 11, and 12, and the two motors are electrically connected by means of the wire 13, all of which is clearly illustrated in said Fig. 3.

The operation of the several parts is practical and very simple, and a cheap and efficient mechanism has been produced which can be secured in position to any well-known construction of vehicle for propelling the same.

I am fully aware that changes may be made in the several arrangements and details of the construction of the various parts described in the accompanying specification and illustrated in the drawings without departing from the scope of my present invention, and it will be readily seen that in place of two motors and two sets of gear mechanism for actuating the wheels of the vehicle I may employ but one motor and one set of gear-wheels connected therewith. Hence I do not limit my invention to the exact arrangement and combinations of the various parts as herein set forth and illustrated in the accompanying drawings, nor do I confine myself to the exact details of the construction thereof.

Having thus described my invention, what I claim is—

1. In a vehicle, the combination, with the framework thereof, and one or more of its wheels, of a supporting-frame connected with the framework of the vehicle, a motor or motors on said supporting-frame, a gear-wheel C, consisting, essentially, of a body portion $c$, an annular flange or shoulder $c'$ thereon, radially-arranged arms or spokes, and a ring-shaped part in the center, adapted to be fitted over the hub of the wheel, gear-teeth on the outer periphery of said wheel C, clamps $a^3$ adapted to be passed around the spokes of the wheel of the vehicle, having screw-threaded bolt portions adapted to be passed through perforations in the body portion $c$ of said gear C, and nuts thereon for securing said gear against the sides of the spokes of the wheel, and an operative connection between said gear and the motor or motors, substantially as and for the purposes set forth.

2. In a vehicle, the combination, with the framework thereof, and one or more of its wheels, of a spring-supported and spring-actuated supporting-frame connected with the framework of the vehicle, a motor or motors on said supporting-frame, a gear-wheel C, consisting, essentially, of a body portion $c$, an annular flange or shoulder $c'$ thereon, radially-arranged arms or spokes, and a ring-shaped part in the center, adapted to be fitted over the hub of the wheel, gear-teeth on the outer periphery of said wheel C, clamps $a^3$ adapted to be passed around the spokes of the wheel of the vehicle, having screw-threaded bolt portions adapted to be passed through perforations in the body portion $c$ of said gear C, and nuts thereon for securing said gear against the sides of the spokes of the wheel, and an operative connection between said gear and the motor or motors, substantially as and for the purposes set forth.

3. In a vehicle, the combination, with one or more of its wheels, of a gear C secured to the spokes of said wheel or wheels, said gear C consisting, essentially, of a body portion $c$, an annular flange or shoulder $c'$ thereon, radially-arranged arms or spokes, and a ring-shaped part in the center, adapted to be fitted over the hub of the wheel, gear-teeth on the outer periphery of said wheel C, clamps $a^3$ adapted to be passed around the spokes of the wheel of the vehicle, having screw-threaded bolt portions adapted to be passed through perforations in the body portion $c$ of said gear C, and nuts thereon for securing said gear against the sides of the spokes of the wheel, and a motor or motors operatively connected with said gear or gears, substantially as and for the purposes set forth.

4. In a vehicle, the combination, with the framework thereof, and the rear axle of said vehicle, of a motor-supporting frame D pivotally secured to said axle, said frame consisting, essentially, of side bars $d$, and a pair of connecting strips or bars $d'$ and $d^2$ at the front end of said frame, a plate $d^7$ secured in position to the reaches of the framework of the vehicle, and a spring-encircled bolt or bolts connected with the said plate $d^7$ and the forward end of said frame D, substantially as and for the purposes set forth.

5. In a vehicle, the combination, with the framework thereof, and the rear axle of said vehicle, of a motor-supporting frame D pivotally secured to said axle, said frame consisting, essentially, of side bars $d$, and a pair of connecting strips or bars $d'$ and $d^2$ at the front end of said frame, a plate $d^7$ secured in position to the reaches of the framework of the vehicle, a pair of cross-plates $d^{10}$ and $d^{11}$ secured to said bars $d'$ and $d^2$ directly above said bar or plate $d^7$, and a pair of spring-encircled bolts connected with said plates $d^7$ and $d^{10}$ and $d^{11}$, substantially as and for the purposes set forth.

6. In a vehicle, the combination, with the framework thereof, and the rear axle of said vehicle, of a motor-supporting frame D pivotally secured to said axle, said frame consisting, essentially, of side bars $d$, and a pair of connecting strips or bars $d'$ and $d^2$ at the front end of said frame, a plate $d^7$ secured in position to the reaches of the framework of the vehicle, and a spring-encircled bolt or bolts connected with said plate $d^7$ and the forward end of said frame D, a motor or motors on said supporting-frame, a gear-wheel C, consisting, essentially, of a body portion $c$, an annular flange or shoulder $c'$ thereon, radially-arranged arms or spokes, and a ring-shaped part in the center, adapted to be fitted over the hub of the wheel of the vehicle, gear-teeth on the outer periphery of said wheel C, clamps $a^3$ adapted to be passed around the spokes of the wheel of the vehicle, having screw-threaded bolt portions adapted to be passed through perforations in the body portion $c$ of said gear C, and nuts thereon for securing said gear against the sides of the spokes of the wheel, and an operative connection between said gear and the motor or motors, substantially as and for the purposes set forth.

7. In a vehicle, the combination, with the framework, thereof, and the rear axle of said vehicle, of a motor-supporting frame D pivotally secured to said axle, said frame consisting, essentially, of side bars $d$, and a pair of connecting strips or bars $d'$ and $d^2$ at the front end of said frame, a plate $d^7$ secured in position to the reaches of the framework of the vehicle, a pair of cross-plates $d^{10}$ and $d^{11}$ secured to said bars $d'$ and $d^2$ directly above said bar or plate $d^7$, and a pair of spring-encircled bolts connected with said plates $d^7$ and $d^{10}$ and $d^{11}$, a motor or motors on said supporting-frame, a gear-wheel C, consisting, essentially, of a body portion $c$, an annular flange or shoulder $c'$ thereon, radially-arranged arms or spokes, and a ring-shaped part in the center, adapted to be fitted over the hub of the wheel, gear-teeth on the outer periphery of said wheel C, clamps $a^3$ adapted to be passed around the spokes of the wheel of the vehicle, having screw-threaded bolt portions adapted to be passed through perforations in the body portion $c$ of said gear C, and nuts thereon for securing said gear against the sides of said spokes of the wheel, and an operative connection between said gear and the motor or motors, substantially as and for the purposes set forth.

In testimony that I claim the invention set forth above I have hereunto set my hand this 17th day of June, 1899.

FRANK K. IRVING.

Witnesses:
FREDK. C. FRAENTZEL,
WALTER H. TALMAGE.